Figure 7:
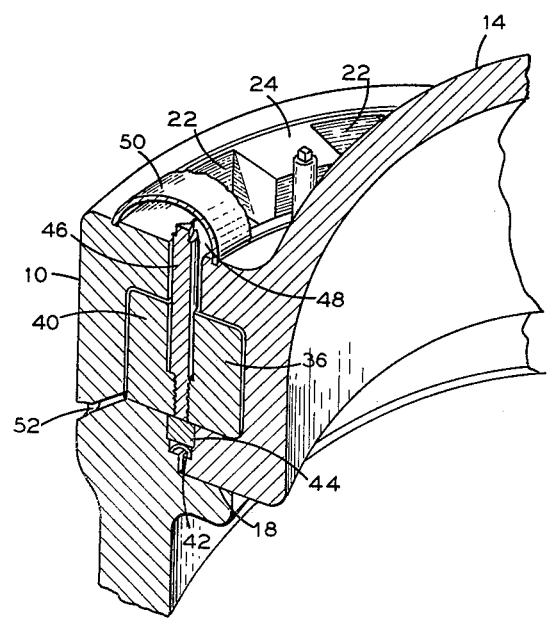

Dec. 15, 1964  N. R. JOHANSON  3,161,317
PRESSURE VESSEL CLOSURE
Filed Oct. 26, 1962  2 Sheets-Sheet 1
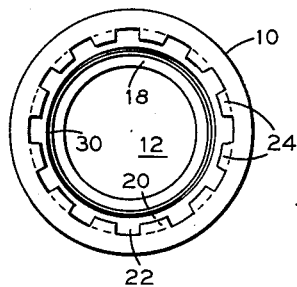
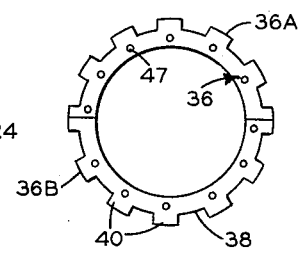
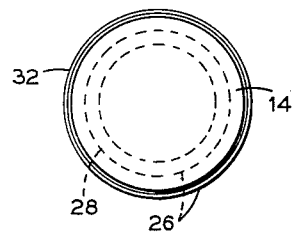
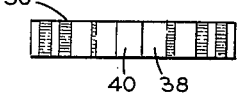
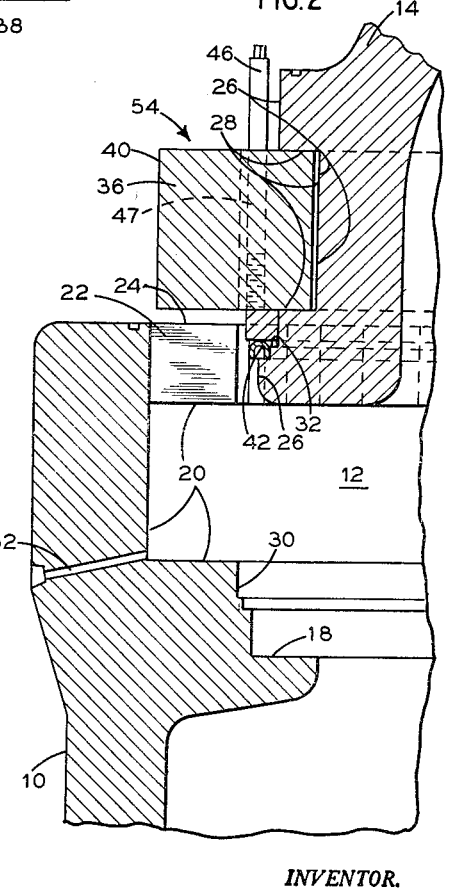
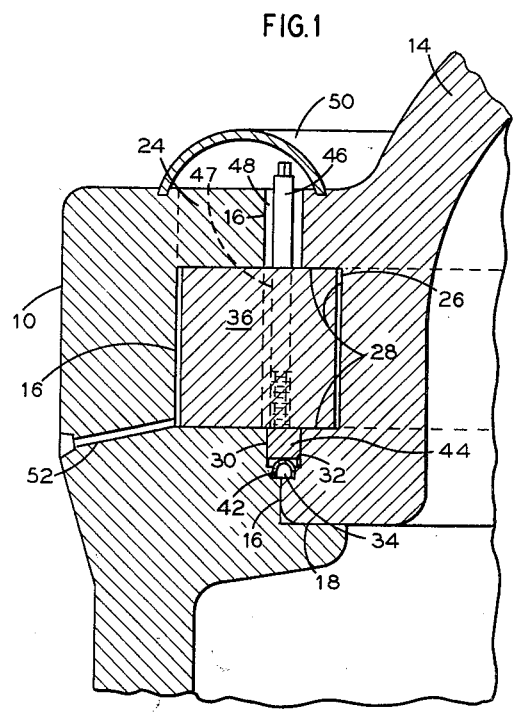
INVENTOR.
Norman R. Johanson
BY
ATTORNEY

United States Patent Office 3,161,317
Patented Dec. 15, 1964

3,161,317
PRESSURE VESSEL CLOSURE
Norman R. Johanson, Alliance, Ohio, assignor to The Babcock & Wilcox Company, New York, N.Y., a corporation of New Jersey
Filed Oct. 26, 1962, Ser. No. 233,350
8 Claims. (Cl. 220—40)

This invention relates to closures for pressure vessels and more particularly to nonbolted closures for such vessels which are capable of withstanding high internally imposed pressures.

Due to recent commercial developments there has been a demand for pressure vessels of increased size capable of operation at higher pressure and temperature conditions than have previously been used. In addition may of these vessels have required a closure member which can be simply and quickly assembled and disassembled to provide easy access to the interior of the vessel. To date most of the pressure vessels have utilized bolted closures, however, because of the excessive size of the flanges and associated studs or bolts and nuts required for such closures the use of nonbolted closures has significant advantages.

The bolted type of closure member, particularly for vessels six feet or greater in diameter, has a number of disadvantages. For example, under certain pressure and temperature loading conditions high axial stresses develop and the studs or bolts tend to elongate, thereby diminishing the pressure sealing effect they provide. Moreover, the bolts and nuts have a tendency to gall or seize making their removal difficult, thus the temperature rate change at which a bolted, flanged vessel can be heated or cooled is limited since both the maximum thermal and mechanical stresses must be kept at an acceptable safe level. Attempts to offset the effects of high axial stresses by using larger bolts have in some instances, exceeded practical limits and introduced design difficulties, e.g., the inability to locate a sufficient number of bolts in the closure to take the load and the increased cost and weight of the closure member and pressure vessel flanges required to compensate for the weakening caused by the decreased ligaments between the bolts. Difficulties have also arisen in assembling and diasassembling the closure member because of its size and the need for special tools, such as bolt tensioners to effect the closure.

A typical example of the large pressure vessel flanged closure here referred to may be noted in patent application Serial No. 145,012, filed October 9, 1961 by the common assignee.

To overcome the fabrication and assembly difficulties described, it is the primary object of the present invention to provide a nonbolted closure suitable for a large diameter vessel for operation at high internal pressure and/or elevated temperature.

Another object of the present invention is to provide a nonbolted closure which has a minimum number of parts and which can be easily and speedily assembled and diassembled.

Thus in this advantageous closure design the present invention provides a high pressure vessel closure comprising a vertically arranged vessel having a circular opening at one end arranged to receive a grooved closure member. Both the inwardly facing surfaces of the pressure vessel at its opening and the corresponding outwardly facing surfaces on the closure member have annularly spaced grooves disposed in opposing relationship. The portion of the pressure vessel above its inwardly directed groove is rabbeted or grooved about the circumference to provide a plurality of uniformly spaced vertically arranged channels. In like manner the outwardly facing surface of a closure or sealing ring is rabbeted so that its projecting portions will pass through the grooves in the pressure vessel and seat within the cooperating facing surfaces of the pressure vessel and closure member, thereby securing the closure member within the opening against the internal pressure of the vessel.

Additionally an upwardly facing groove is located below the ring partly in the pressure vessel and partly in the closure member. This groove is arranged to receive a gasket which spans and forms a seal for the joint between the pressure vessel and closure member. Superimposed on the gasket within the groove is a backup ring which in combination with a bolt assembly loads the gasket so that it seals the joint between the pressure vessel and closure member.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Of the drawings:
FIG. 1 is a partial vertical section of a pressure vessel and closure member embodying the present invention;
FIG. 2 is a partial vertical section similar to FIG. 1 with the closure member and ring shown in position to be assembled within the vessel;
FIG. 3 is a top view of the pressure vessel reduced in size from the partial view shown in FIG. 1;
FIG. 4 is a top view of the ring reduced in size from the partial view shown in FIG. 1;
FIG. 5 is a side view of the ring shown in FIG. 4;
FIG. 6 is a top view of the closure member reduced in size from the partial view shown in FIG. 1; and
FIG. 7 is a perspective view of pressure vessel and closure member shown in FIG. 1.

In FIGS. 1 and 2 there is shown a vertically arranged pressure vessel 10 having a circular opening 12 closed by a closure member 14. Within its opening 12 the vessel has an inwardly directed surface 16 with a shoulder 18 at its lower end upon which the closure member 14 rests. Above the shoulder 18 the surface 16 of the pressure vessel cooperates in forming an inwardly facing, annular-shaped groove 20. Directly above the groove 20 the inner top edge of the pressure vessel is rabbeted providing a number of radial uniformly spaced alternately arranged channels 22 and tooth-like projections 24, see FIGS. 3 and 7.

Disposed opposite the surface 16 of the closure member 14 has an outwardly facing surface 26 formed with an outwardly directed annular groove 28 which, in assembled position, registers with groove 20 in the pressure vessel. Below the respective grooves 20, 28, the pressure vessel and closure member have opposed stepped surfaces 30, 32, respectively, which combine to form an upwardly facing groove 34.

Ring 36 is disposed within the opposing grooves 20, 28 and holds the closure member 14 within the opening 12 against the pressure developed within the vessel 10. The outer surface of the ring is rabbeted in a manner similar to that of the pressure vessel providing uniformly spaced alternate channels 38 and projections 40, see FIGS. 4 and 5. These channels 38 and projections 40 on the ring are arranged to correspond to the channels 22 and projections 24 in the open top of the pressure vessel so that the ring may be inserted within the groove 20.

Within the groove 34 is an annular-shaped half-round gasket 42 which spans the joint between the pressure vessel and closure member and preferably is made from a material, such as stainless steel. Superimposed on the gasket 42 is a backup ring 44 which, about its top surface, contacts a number of bolt assemblies 46. The bolt assemblies 46 are in threaded engagement with the ring 36 at the lower portions of the holes 47 and then extend upwardly to a point above the top of the pressure vessel. Above the ring 36 the bolts are positioned within an annular slot 48 located between the upper part of the opposing surfaces 16, 26 of the pressure vessel and closure member, respectively.

Disposed across the joint between the pressure vessel 10 and closure member 14 and spanning the channels 22 and groove 48 is an annular-shaped flexible membrane 50. This mebrane is integrally attached around its inner edge to the closure member 14 and around its outer edge to the pressure vessel 10 forming a fluid-tight seal for the joint between these two members. Within the wall of the pressure vessel 10 is a drain 52 which extends from the lower corner of the groove 20 to the exterior of the vessel.

In assembly and disassembly the closure member 14, the ring 36 disposed within groove 28, and the gasket, backup ring and bolt assemblies act as a single closure unit 54. This is illustrated in FIG. 2 where the closure unit is shown about to be inserted through the channels 22 in the pressure vessel into the groove 20. As can be noted in FIG. 4 the ring 36 comes in two sections 36A and 36B so that it may be assembled within the groove 28 on the closure member. Once assembled within the groove 28 the sections of the ring 36 are mechanically connected as by counter-sunk bolts (not shown). When placing the closure unit 54 within the opening 12 the projections 40 on the ring 36 pass through the channels 22 in the vessel. Thus in its assembled position within the opening the closure member 14 rests on the shoulder 18, the ring 36 rests on the lower surfaces of the grooves 20, 28 of the pressure vessel and closure member, respectively, and the gasket 42 and its backup ring 44 are disposed within the groove 34. Taking up several turns on the bolt assembly 46, after rotating the ring 36 until its projections 40 line up below the projections 24, the backup ring exerts pressure downwardly on the gasket 42 providing a seal across the joint between the pressure vessel and closure member maintaining the sealing relationship within the groove 34 regardless of the pressure within the vessel. At the same time the bolt, since it is in threaded engagement with the ring, forces upwardly against the upper surfaces of the grooves, 20 and 28.

In assembling or disassembling the head, a mechanical device such as a strap puller, jack or similar device may be employed to rotate the ring 36 until the projections 40 line up below the projections 24 on the pressure vessel.

After the closure member is placed in position, the ring 36 rotated, the bolts 46 tightened to form gasket seal 42, and before the internal pressure is applied, the membrane 50 is integrally attached both to the closure member and to the pressure vessel. It should be noted that membrane 50 forms an additional seal at the joint and that it is not a required element of the invention. When pressure is supplied to the interior of the vessel, the closure member 14 will be forced upwardly urging the ring projections 40 against the projections 24 on the pressure vessel. It will be observed that membrane 50 as well as gasket 42, being of flexible construction and contour, will thereby accommodate changes in the vessel and head relationships incident to differential temperatures within the metal.

For disassembly the procedure described above is reversed, and the closure unit 54 is removed as a single member once the membrane 50 is removed from the joint.

This closure eliminates the use of bolts to attach the closure member to the pressure vessel and to maintain a fluid-tight joint against internal pressure. Instead, all that is necessary to secure the closure member within the opening in the pressure vessel is to insert the ring 36 into the groove 20 and rotate the ring so that its projections 40 engage the superjacent projections 24 on the opening of the pressure vessel. In this arrangement the bolts in effect do nothing more than seal the gasket 42 within the groove 34. It is evident that they do not carry any of the load for attaching the closure member to the pressure vessel, hence present difficulties encountered from this source are eliminated. During assembly or disassembly only the closure unit 54 and the comparatively light membrane need be handled as separate pieces as compared to the cumbersome, heavy, flanged closure member and large number of heavy bolts that would have to be handled in a bolt connected closure. Additionally, the present invention avoids the use of special tools, such as are required in assembling the heavy bolts in the bolt-type closure. Therefore, it should be readily apparent that this arrangement reduces the size and complexity of the closure while permitting it to be more simply and speedily assembled and disassembled. Moreover, initial capital cost as well as maintenance costs are substantially reduced.

While the gasket 42 has been shown as a half-round or U-shaped section, it will be readily apparent to those skilled in the art that other shapes of gaskets may be employed to equal advantage.

The drain 52 serves to detect the presence of leakage within the interior of the pressure vessel.

While in accordance with the provisions of the statutes the invention has been illustrated and described in the best form and mode of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A high pressure vessel closure comprising:
    (A) a pressure vessel having an opening therein,
    (B) an inwardly facing surface on said pressure vessel at said opening,
    (C) an annular groove formed in said surface,
    (D) a closure member disposed within and arranged to close the opening in said pressure vessel,
    (E) an outwardly facing surface on said closure member in opposed relationship with said inwardly facing surface on said pressure vessel,
    (F) an annular groove formed in said outwardly facing surface opposed to and registering with the groove in said pressure vessel,
    (G) a ring disposed within said grooves to secure said closure member within the opening in said pressure vessel,
    (H) the outer face of said ring rabbeted to form a number of channels extending in parallel relationship with the axis of said ring,
    (I) the portion of said pressure vessel above its groove rabbeted to form a number of channels whereby the rabbeted portions of said ring and pressure vessel fit together permitting the ring to pass downwardly through the rabbeted portions of the pressure vessel and be inserted into its inwardly facing groove.

2. A high pressure vessel closure according to claim 1 wherein a second annular groove is located partly in said pressure vessel and partly in said closure member and extends downwardly from the lower surfaces of the grooves in said pressure vessel and closure member.

3. A high pressure vessel closure according to claim 2 wherein a deformable gasket is positioned within said second groove.

4. A high pressure vessel closure according to claim 3 wherein a backup ring is disposed within said second groove above and in contact with said gasket, and a bolt assembly is connected at its lower end to said backup ring and extends upwardly through and in threaded engagement with said ring so that by taking up on the bolt said backup ring depresses said gasket causing it to deform and provide a seal across the joint between said pressure vessel and closure member, and lifts said ring against the upper faces of said grooves.

5. A high pressure vessel closure according to claim 4 wherein an annular shaped flexible membrane is positioned across the joint between and welded to said pressure vessel and closure member for forming a fluid-tight seal for said pressure vessel.

6. A high pressure vessel closure according to claim 5 wherein a passageway extends between the groove in said pressure vessel and the exterior of said pressure vessel whereby leakage of fluid from said vessel past said gasket may be detected.

7. A high pressure vessel closure according to claim 6 wherein said pressure vessel is vertically elongated and its opening is circular and is located at the upper end of said vessel.

8. A high pressure vessel closure according to claim 7 wherein said ring is segmented.

References Cited in the file of this patent

UNITED STATES PATENTS

| | | |
|---|---|---|
| 2,729,491 | Sieder | Jan. 3, 1956 |
| 2,822,109 | Tangard | Feb. 4, 1958 |